United States Patent [19]

Stephan

[11] 4,168,869
[45] Sep. 25, 1979

[54] COMBINED RADIAL AND AXIAL BEARING DEVICE

[75] Inventor: Gerard Stephan, Croissy, France

[73] Assignee: Nadella, Rueil-Malmaison, France

[21] Appl. No.: 888,917

[22] Filed: Mar. 22, 1978

[30] Foreign Application Priority Data

Mar. 29, 1977 [FR] France ................................. 77 09263

[51] Int. Cl.² ............................................. F16C 19/34
[52] U.S. Cl. .................................... 308/174; 308/212; 308/235
[58] Field of Search ................... 308/174, 207 R, 212, 308/213, 219, 227, 231, 232, 234, 235

[56] References Cited

U.S. PATENT DOCUMENTS

| 3,930,692 | 1/1976 | Condon et al. | 308/174 |
| 3,934,956 | 1/1976 | Pitner | 308/212 |

*Primary Examiner*—Charles E. Frankfort

[57] ABSTRACT

A combined radial and axial bearing device wherein the axial or thrust bearing has limited axial movement relative to the radial bearing to make the bearing device easier to fit and be capable of accommodating a range of tolerances in the size of a support housing the bearing device.

9 Claims, 4 Drawing Figures

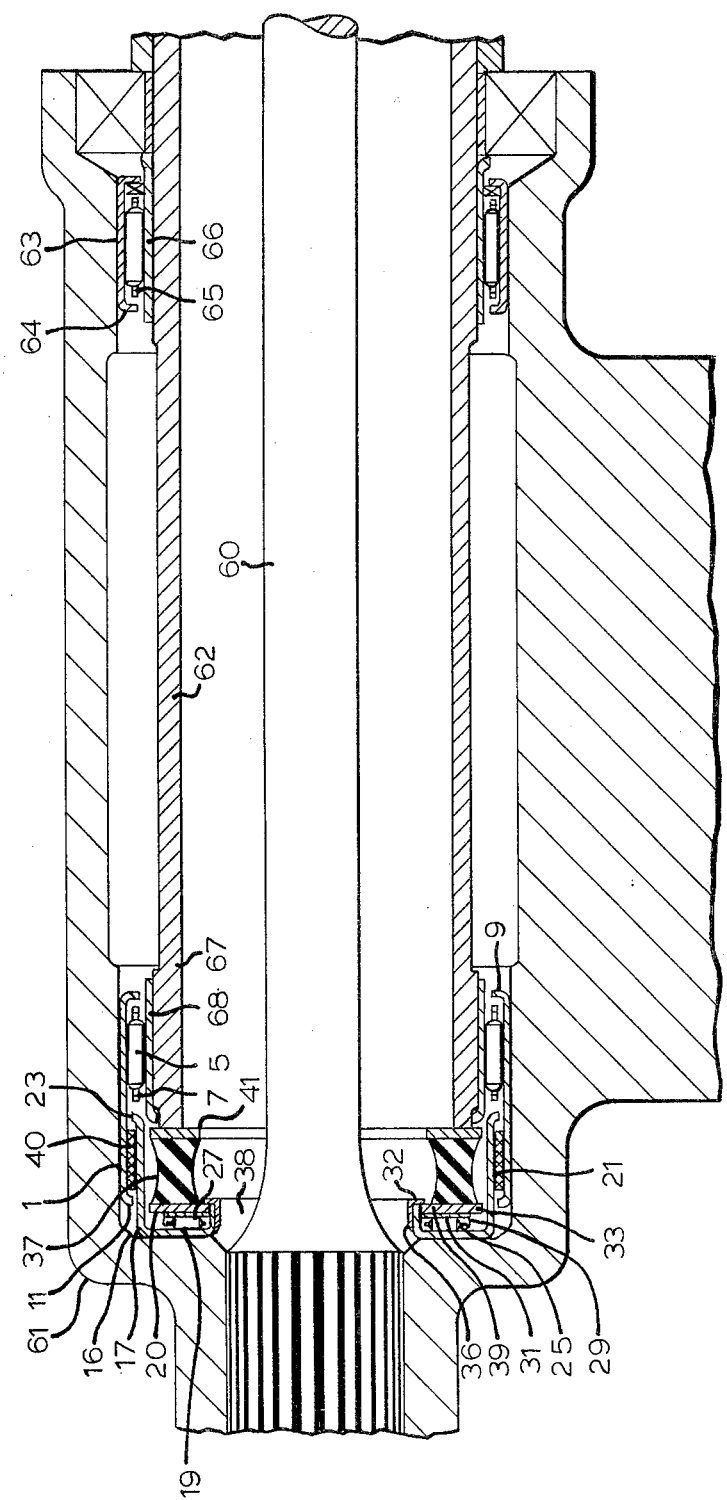

COMBINED RADIAL AND AXIAL BEARING DEVICE

This invention relates to a bearing capable of supporting both radial and axial loads, commonly called combined bearings.

Combined bearings are known to have a generally stamped ring, the cylindrical surface of which forms the outer race of the radial bearing while the axial bearing race is carried either by one end of the ring, forming what is hereinafter referred to as an internal combined bearing, or by an element extending radially to the exterior of the ring, forming what is hereinafter referred to as an external combined bearing.

In internal combined bearings, the thrust exerted towards the end of the ring by the rolling elements of the radial bearing necessitates either the use of cages of special configuration or the provision of axial stops connected to or forming an integral part of the ring, thus necessitating the use of bearing elements of complicated forms and consequently of high cost price.

Moreover, all the above-mentioned devices possesses a major drawback by reason of the fact that their assembly must necessarily be effected by mounting to very precise axial tolerances, necessitating the taking of particular precautions in the absence of which there is danger of the bearing being seriously damaged.

In fact, the tight mounting of an internal combined bearing by application of force to a radial flange of the ring does not allow, in practice, axial positioning with sufficient precision, with the result that the axial bearing is damaged either by crushing against its bearing surface, or by the introduction of a shaft to be supported by the bearing when it has not been possible for the axial bearing, in assembly, to abut against said bearing surface.

The fitting of the ring of an external combined bearing according to the prior art meets with the same difficulty by reason of the necessity of mounting to a very precise axial position, defined by the position in which the thrust plate of the axial bearing, which is fast therewith, bears upon a support shoulder perpendicular to the axis of a bore in the support.

Such drawbacks rule out combined bearings from large series applications in which correct and sure assembly must be effected by the set of simple operations carried out by non-specialist workmen or by automatic machines.

According to the present invention, a combined bearing device having cylindrical rolling elements and of the type comprising a thrust plate captive with a radial bearing ring is characterised in that a part including the thrust plate or a portion of the thrust plate engages with relative axial movement within the ring or in a groove formed in the ring, the ring having stops to limit both directions of said relative axial movement.

It is apparent that a bearing device in accordance with the invention allows axial tolerances to be taken up because of the possibility of movement of the thrust plate in relation to the radial ring which permits the bearing device to position itself upon a support on which the device is mounted, thus ensuring simple but correct assembly of the bearing device.

Moreover, such a bearing device also allows, in all cases, mounting of the device by application of force to a flange of the ring, thus avoiding the necessity of overdimensioning of the axial bearing.

According to a first embodiment of the invention the thrust plate is formed by the radial flange of an L-section annulus, the axial portion of which is axially slideable within an end portion of the ring.

The stops may be formed by a radial flange on the ring and a cage for the rolling elements of the radial bearing.

A bearing device in accordance with the invention can be applied in the mounting for a motor vehicle suspension joint.

The above and other features of the present invention are illustrated by way of example on the accompanying drawings, wherein:

FIG. 4 illustrates the application of an internal combined bearing according to the invention in the mounting of a motor vehicle suspension joint.

Figure 1:
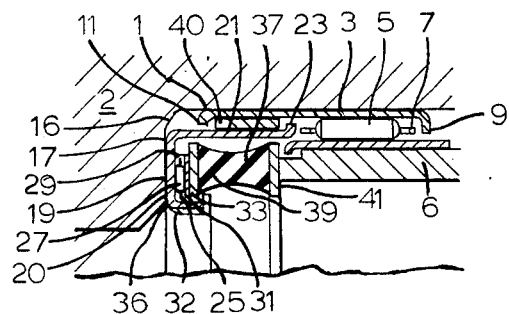
FIG. 1 is a fragmentary axial section of one form of an embodiment of an internal combined bearing according to the invention.

The internal combined bearing shown in the upper part of FIG. 1 comprises a thin, stamped metal, cylindrical ring 1 that is fitted in a bore in a support 2. The cylindrical part of the ring 1 forms the external race having a cylindrical surface 3 for a radial bearing having cylindrical rolling elements 5 that are maintained and guided by a cage 7. Each end of the ring 1 has an inturned radial flange 9, 11.

An L-section annulus 17, forming an open bottom for the cylindrical ring 1, has an inturned radial flange 19 formed as the outer race or thrust plate of an axial bearing 20 and has its axially extending portion 21 co-axially nested within one end portion of the ring. This axially extending portion 21 has at its end an outwardly extending radial flange 23 that acts between the inturned flange 11 on the ring 1 and the cage 7, which act as stops to limit both directions of axial movement of the annulus 17 within the ring 1.

The axial bearing 20 is formed by a cage 25 for retaining and guiding cylindrical rolling elements 27 placed between the thrust plate 19 and a second thrust plate 31 equipped with a collar 29 to retain the cage 25. The second thrust plate 31 is disposed against one face of a flat annular washer 33 to the other face 39 of which is fixed, for example by adhesion or gluing, one end of a cylindrical elastic cushion 37, made for example of a synthetic material. The other end of the cushion 37 is similarly fixed to a washer 41 that is held against the end of a shaft 6 to be supported by the internal combined bearing. The elastic cushion 37 enables the axial bearing 20 to be pre-stressed on assembly of the whole bearing with the shaft 6 within the support 2.

The various elements of the axial bearing are held in assembly with the washer 33 by an axial skirt 32 formed from an axial extension from the inner periphery 36 of the thrust plate 19 that combines within a generally U-shaped ring 38, the arms of which are turned outwardly smoothly over the thrust plate 19 and the washer 33.

The L-section annulus 17 that carries the axial bearing 20 is axially movable within the radial bearing ring 1 with its axial clearance limited in two opposite directions by the contact of the flange 23 with the cage 7 and the flange 11 respectively permitting the correct positioning of the thrust plate 19 against the support 2 by taking up the tolerances during the mounting of the whole bearing device in the bore of the support, which under these conditions can be selected quite widely to facilitate and automate the assembly operations.

In fact, if the assembly is effected with an insufficient axial extension, the introduction of the shaft 6 commences by ensuring the axial displacement of the annulus 17, carrying the axial bearing, in relation to the ring, until the thrust plate 19 abuts against a shoulder 16 in the bore of support 2. If, on the other hand, in the case of assembly with a bearing having a greater than required axial extension, the annulus 17, once thrust plate 19 bears against shoulder 16, commences an axial displacement movement inside the ring 1 thus taking up the mounting tolerances and in all cases avoiding bursting or deterioration of the thrust plate.

On occasions it is useful to fit a separating ring 40 made of sheet metal or even of elastic material and capable of guiding and/or limiting axial movement of the annulus 17, between the radial flanges 11, 23.

Figure 2:
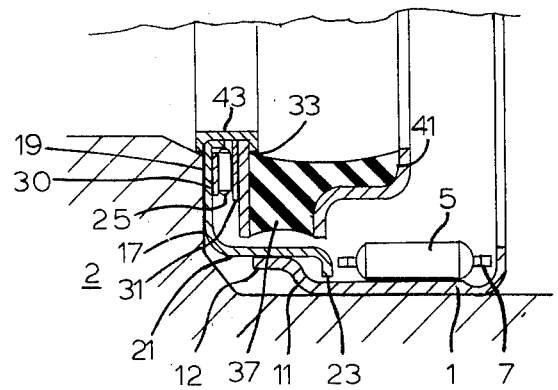
FIG. 2 is a fragmentary section of another form of an embodiment of an internal combined bearing according to the invention.

The embodiment shown in FIG. 2 differs by the flange 11 of the ring 1 having an axial extension 12 to overlie the axial portion 21 of annulus 17 to guide axial movement thereof within the ring 1.

In addition, the axial bearing 20 is here formed by a cage 25 placed between a thrust plate 30, separate from the radial flange 19, and a counterplate 31, the bearing being disposed between the radial flange 19 and the washer 33. The device is kept assembled both radially and axially by a collar 43.

FIG. 2 shows an external combined bearing composed of a ring of stamped sheet metal 1' whose cylindrical surface 3' forms the outer radial race for a radial bearing having a ring of needles or rollers 5' held and guided by a cage 7'. The ring 1' is formed at one end with an inturned radial flange 9' and at the other end with a circumferential groove 50 having side arms 51, 52 between which is trapped the inner periphery 17' of an annular thrust plate 20' of an axial bearing having cylindrical rolling elements 27' held in a cage 25' retained axially and radially by a collar 29', the thrust plate 20' forming a combined monobloc bearing with the radial ring 1'.

As shown, the thrust plate 20' (or a part carrying the thrust plate) is trapped in the groove 50, which centres the plate and permits it to move in two opposite axial directions in relation to and limited by the side arms 51 and 52.

As known per se, it is possible to use a thrust bearing comprising caged rolling elements disposed between a thrust plate 20' and a counter-plate held together by the collar.

The mounting of the ring is effected by application of force to the area "A" of the side arm 51 until the thrust plate bears against a radial surface 16' of the support 2', this can be done with quite wide tolerances as they can be accomodated, on application of a load to the thrust plate, by the axial mobility possessed by the thrust plate in relation to the ring and consequently in relation to the support shoulder 16'.

Figure 3:
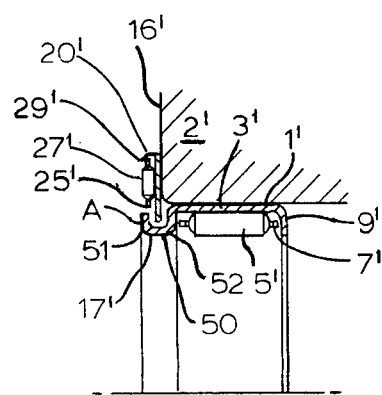
FIG. 3 is an axial section of an external combined bearing according to the invention.

FIG. 3 shows the use of an internal combined bearing in the mounting of a suspension joint for a motor vehicle, the following description of which will be limited to its characteristics connected with the present invention, the general principle of such a joint being known.

A torsion bar 60 for the suspension of a vehicle is fast with a hollow arm 61 to which a wheel is mounted and to the interior of which arm a hollow shaft 62, fast with the vehicle chassis or body, is introduced, the shaft being mounted on the one hand on a conventional radial bearing 64 formed, as known per se, by a thin ring 64 with a cage 65 fitted in the said arm and cooperating with an internal race 66 carried by the shaft, and on the other hand by an internal combined bearing identical with that described and illustrated in the upper part of FIG. 1 (with the same elements designated by the same references). The inner end portion 67 of the shaft, which carries the internal radial race 68 for the needles 5, bears axially against the washer 41 which, with the aid of the cushion 37 allows the fitting of the thrust bearing under pre-stress, the thrust plate 19 being supported by the radial shoulder 16 of the arm 61 fast with the torsion bar 60.

As previously described with reference to FIG. 1, the ring 1 can be mounted in the arm 61 with quite wide tolerances which are taken up either in the mounting or in the assembling of the shaft by virtue of the thrust plate being axially movable into or out of the ring 1.

In a preferred form, the combined bearing according to the invention is manufactured with both the radial bearing ring and the thrust plate annulus formed of metal stampings.

However, it is possible to make such a bearing from two machined parts or from a machined part cooperating with another part, for example a stamped ring.

I claim:

1. A combined radial and axial bearing device for supporting a shaft comprising:
    (a) a radial bearing composed of a radial bearing ring containing first and second stop means disposed on the terminal portions thereof and rolling elements disposed between said stop means; and,
    (b) an axial bearing composed of an L-section annulus having a radial flange portion thereof as a thrust plate and an axially extending portion of said thrust plate coaxially nested within one end portion of said bearing ring, having additional stop means on its terminal portion and axially movable between said rolling elements and said first stop means.

2. A device as set forth in claim 1 wherein said first and second stop means are radial flanges on said radial bearing ring, said rolling elements are disposed and encaged there between, and said thrust plate is axially movable between said cage and said first stop means.

3. A device as set forth in claim 2, including an annular separating member disposed between the said first and said second stop means.

4. A device as set forth in claim 3, including an elastomeric cushion spaced apart from the radial flange portion of said thrust plate and disposed between it and a means adapted to be in contact with the shaft.

5. A device as set forth in claim 4 wherein the axial bearing includes the radial flange portion of said thrust plate, a washer, a counterplate, an elastomeric cushion, and rolling elements positioned between said radial flange portion of said thrust plate and said counterplate, said axial bearing being disposed against the washer to which said elastomeric cushion is attached.

6. A device as set forth in claim 5, including an axail skirt, wherein the radial flange portion of said thrust plate, said couterplate and said washer are retained together by said axial skirt.

7. A device as set forth in claim 1, wherein at least a portion of said bearing ring overlies and is adapted to axially guide at least a portion of the axially extending portion of said thrust plate.

8. A device as set forth in claim 5, wherein said device includes a hollow vehicular suspension arm, a hollow shaft mounted inside said suspension arm by said bearing device, said hollow vehicular suspension arm having a radial shoulder therein and said radial bearing ring is fitted inside said arm with said thrust plate against said radial shoulder, said second mentioned rolling elements bearing against the outer surface of said hollow shaft and said elastomeric cushion acting against the washer disposed on one end of said hollow shaft.

9. A combined bearing device having rolling elements comprising: a radial bearing ring and a thrust plate,, said radial bearing ring having an outward facing "U" shaped circumferential groove formed in its outermost surface in one terminal portion thereof, a portion of said thrust plate positioned within said groove and slidably engaged and axially movable between the sidewalls of said groove, said sidewalls being adapted to act as stops to limit axial movement of said thrust plate in two directions.

* * * * *